United States Patent [19]

Hara et al.

[11] Patent Number: 5,205,248
[45] Date of Patent: Apr. 27, 1993

[54] INTAKE- AND/OR EXHAUST-VALVE TIMING CONTROL SYSTEM FOR INTERNAL COMBUSTION ENGINES

[75] Inventors: Seinosuke Hara; Seiji Tsuruta, both of Kanagawa, Japan

[73] Assignee: Atsugi Unisia Corp., Atsugi, Japan

[21] Appl. No.: 792,358

[22] Filed: Nov. 14, 1991

[30] Foreign Application Priority Data

Nov. 16, 1990 [JP] Japan ................................. 2-310848
Sep. 30, 1991 [JP] Japan ................................. 3-251724

[51] Int. Cl.⁵ ........................................... F01L 1/34
[52] U.S. Cl. ........................... 123/90.17; 123/90.31; 464/2
[58] Field of Search ............... 123/90.15, 90.17, 90.31; 464/2, 160

[56] References Cited

U.S. PATENT DOCUMENTS

| | | | |
|---|---|---|---|
| 4,231,330 | 11/1980 | Garcea | 123/90.15 |
| 4,754,727 | 7/1988 | Hampton | 123/90.17 |
| 4,960,084 | 10/1990 | Akasaka et al. | 123/90.17 |
| 5,067,450 | 11/1991 | Kano et al. | 123/90.17 |

FOREIGN PATENT DOCUMENTS

361980 4/1990 European Pat. Off.
4108111 10/1991 Fed. Rep. of Germany.
61-279713 12/1986 Japan.

*Primary Examiner*—David A. Okonsky
*Assistant Examiner*—Weilun Lo
*Attorney, Agent, or Firm*—Bachman & LaPointe

[57] ABSTRACT

An intake- and/or exhaust-valve timing control system for an internal combustion engine comprises a ring gear disposed between a rotating member having a driven connection with an engine crankshaft and a camshaft for changing a relative phase angle between the rotating member and the camshaft so as to control intake- and/or exhaust-valve timing of the engine depending on the operating state of the engine. The valve control system includes at least one pair of friction surfaces for creating friction torque between the rotating member and the camshaft so as to suppress a rapid change in relative rotational speed of the camshaft to the rotating member, and a spring for biasing one of the frictional surfaces to the other.

14 Claims, 5 Drawing Sheets

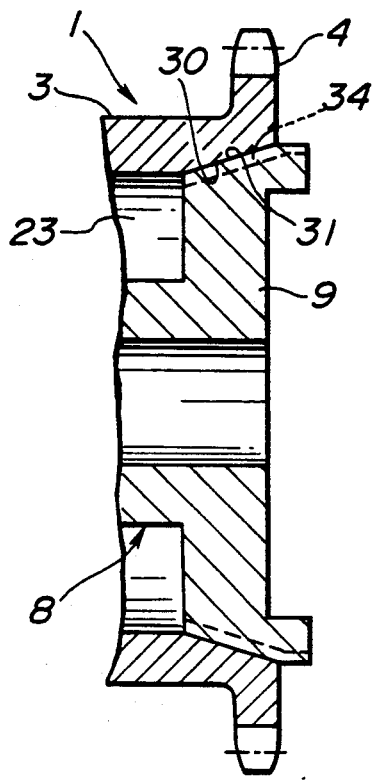
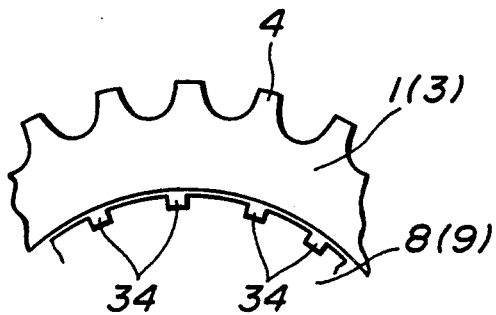
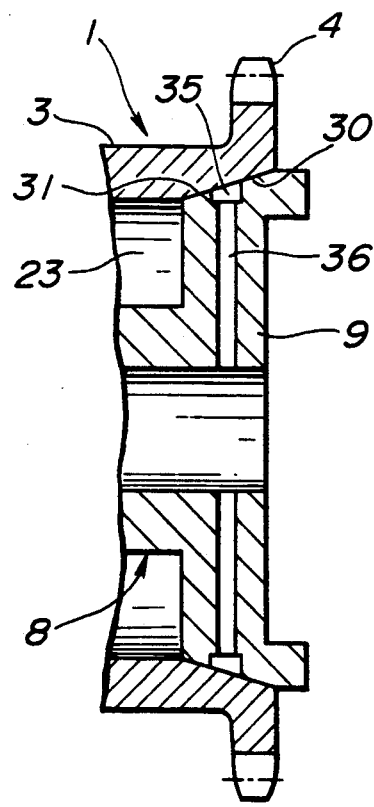

INTAKE- AND/OR EXHAUST-VALVE TIMING CONTROL SYSTEM FOR INTERNAL COMBUSTION ENGINES

BACKGROUND OF THE INVENTION

1. Field of the Invention

The present invention relates to an intake-and/or exhaust-valve timing control system for internal combustion engines which is variably capable of controlling the intake- and/or exhaust-valve timing depending upon the operating state of the engine, for example the magnitude of engine load and/or engine speed.

2. Description of the Prior Art

Recently, there have been proposed and developed various intake- and/or exhaust-valve timing control systems for internal combustion engines for generating optimal engine performance according to the operating state of the engine.

As is generally known, the valve timing is determined such that optimal engine performance is obtained, however the predetermined valve timing is not suitable under all operating conditions. For example, when the engine is operating within a range of low revolutions, higher torque will be obtained with an intake-valve timing earlier than the predetermined valve timing.

Such a conventional intake- and/or exhaust-valve timing control system for internal combustion engines has been disclosed in U.S. Pat. No. 4,231,330. In this conventional valve timing control system, a cam sprocket is rotatably supported through a ring gear mechanism by the front end of a camshaft. The ring gear mechanism includes a ring gear having an inner toothed portion engaging another toothed portion formed on the front end of the camshaft and an outer toothed portion engaging an inner toothed portion formed on the inner peripheral wall of the cam sprocket. In this manner, the ring gear rotatably engages between the cam sprocket and the camshaft. The ring gear is normally biased in the axial direction of the camshaft by means of a return spring, such as a coil spring. At least one of the two meshing pairs of gears is helical. The result is that axial sliding movement of the ring gear relative to the camshaft causes the camshaft to rotate about the cam sprocket and therefore the phase angle between the camshaft and the cam sprocket (and consequently, the phase angle between the camshaft and the engine crankshaft) is relatively varied. The ring gear moves as soon as one of the two opposing forces acting on it, namely the preloading pressure of the above spring means or the oil pressure applied from the oil pump to the ring gear, exceeds the other. However, in this conventional valve timing control systems, each of the two meshing pairs of gears has backlash or play therebetween. During operation of the ring gear, the backlash results in collision between the teeth and thereby causes noise and fluctuations in the torque of the camshaft.

To avoid the above problem, an improved conventional intake- and/or exhaust-valve timing control system has been disclosed in Japanese Patent First Publication (Tokkai Showa) 61-279713. In this valve timing control system, the ring gear, which is disposed between the timing belt pulley and the camshaft, includes a pair of ring gear elements. The pair of ring gear elements are formed in such a manner as to divide a relatively long ring gear including inner and outer toothed portions into two parts by cutting or milling. Therefore, the two ring gear elements have essentially the same geometry with regard to the inner and outer teeth. These ring gear elements are interconnected by a plurality of connecting pins which are fixed on one of the ring gear elements through an annular hollow of the other ring gear element. The annular hollow is traditionally filled with elastic materials, such as cylindrical rubber bushing attached by vulcanizing. Alternatively, a plurality of coil springs may be provided in the annular hollow, while the springs are supported by the heads of the connecting pins serving as spring seats. In this conventional timing control system, when the ring gear elements and the connecting pins are assembled, the two ring gear elements are interconnected in such a manner as to be slightly offset from each other. In other words, the angular phase relationship between the two ring gear elements is designed so as to be set to an angular position slightly offset from each other. The above noted offset is preset to a slightly greater value than the offset of the ring gear when meshed with its connecting gears. In this construction of the ring gear, due to the offsetting of the ring gear elements, the apparent tooth thickness of each tooth of the ring gear is greater than the actual tooth thickness. Therefore, backlash between each meshing pair of gears is eliminated by the return spring force generated by the cylindrical rubber bushing or the coil springs serving as a backlash eliminator.

In the aforementioned constructions, the conventional valve timing control system disclosed in the Japanese Patent First Publication (Tokkai Showa) 61-279713 can effectively prevent noise due to collision between teeth and fluctuations in the torque of the camshaft.

However, the construction of the previously noted two split type ring gear member having a backlash eliminator is complicated. Furthermore, since an axial length of the conventional ring gear member is relatively great, the entire length of the valve timing system is increased. As a result, the overall engine size and engine weight become large. Therefore, the lay-out of the engine may be limited in the engine room.

SUMMARY OF THE INVENTION

It is, therefore in view of the above disadvantages, an object of the present invention to provide an intake- and/or exhaust-valve timing control system for internal combustion engines, which can reliably eliminate backlash between meshed pairs of gears with a relatively simple construction of the system.

It is another object of the invention to provide an intake- and/or exhaust-valve timing control system which can be manufactured at relatively low cost.

In order to accomplish the aforementioned and other objects, an intake- and/or exhaust-valve timing control system for an internal combustion engine comprises a ring gear disposed between a rotating member having a driven connection with an engine crankshaft and a camshaft for changing a relative phase angle between the rotating member and the camshaft so as to control intake- and/or exhaust-valve timing of the engine depending on the operating state of the engine. The valve timing control system according to the invention also comprises means for generating friction torque between the rotating member and the camshaft so as to suppress a rapid change in relative rotational speed of the camshaft to the rotating member. The friction torque generating means may comprise at least one abutting pair of frictional surfaces, respectively provided on the rotating member and the camshaft, and means for press-fitting one of the frictional surfaces to the other. The frictional surfaces are abutted to each other in an axial direction of the camshaft. The frictional surfaces include radially extending annular surfaces, respectively formed on an inner bore of the rotating member and a side wall of a flange portion of the camshaft.

The frictional surfaces may be comprised of a pair of tapered surfaces being press-fitted to each other in the axial direction. The friction torque generating means may include at least one oil capturing groove formed on at least one of the tapered surfaces, for providing a thin oil film between the tapered surfaces so as to maintain a substantially constant magnitude of the friction torque. The oil capturing groove is radially or circumferentially formed on the tapered surface. The oil capturing groove may be connected through a fluid passage formed in the camshaft to a working fluid pressure source.

The friction torque generating means may comprise a friction member inserted into a press-fitted section between the rotating member and the camshaft to create the friction torque by two abutting pairs of friction surfaces defined between the friction member and the rotating member and between the friction member and the camshaft, and means for press-fitting the abutting friction surfaces to each other. The press-fitting means may include a spring operably supported at the front end of the camshaft such that one of the frictional surfaces is biased to the opposing frictional surface.

The friction torque generating means may comprise a friction member having a wedge shape in cross-section, inserted into a press-fitted section between the rotating member and the camshaft to create the friction torque by two abutting pairs of friction surfaces defined between the friction member and the rotating member and between the friction member and the camshaft, and means for press-fitting the friction member into the press-fitted section. The press-fitting means for the friction member may include a spring operably disposed between the rotating member and the camshaft for biasing the ring gear in one axial direction. Alternatively, the press-fitting means for the friction member may include a diaphragm type spring operably received on an inner peripheral wall of the rotating member. The diaphragm type spring may be comprised of a wave spring-washer. The wedge-shaped friction member may include both ends opposing to each other with a predetermined aperture for allowing the friction member to radially and circumferentially expand or contract so as to provide a substantially constant magnitude of the friction torque during operation of the ring gear.

BRIEF DESCRIPTION OF THE DRAWINGS

FIG. 4A is a partial cross-sectional view illustrating a fourth embodiment of the valve timing control system according to the invention.

FIG. 4B is a fragmentary cross-sectional view of the fourth embodiment of FIG. 4A.

FIG. 5 is a partial cross-sectional view illustrating a fifth embodiment of the valve timing control system according to the invention.

DESCRIPTION OF THE PREFERRED EMBODIMENTS

The principles of the present invention applied to intake- and/or exhaust-valve timing control systems for internal combustion engines are illustrated in FIGS. 1A to 8.

First embodiment

Figure 1A:
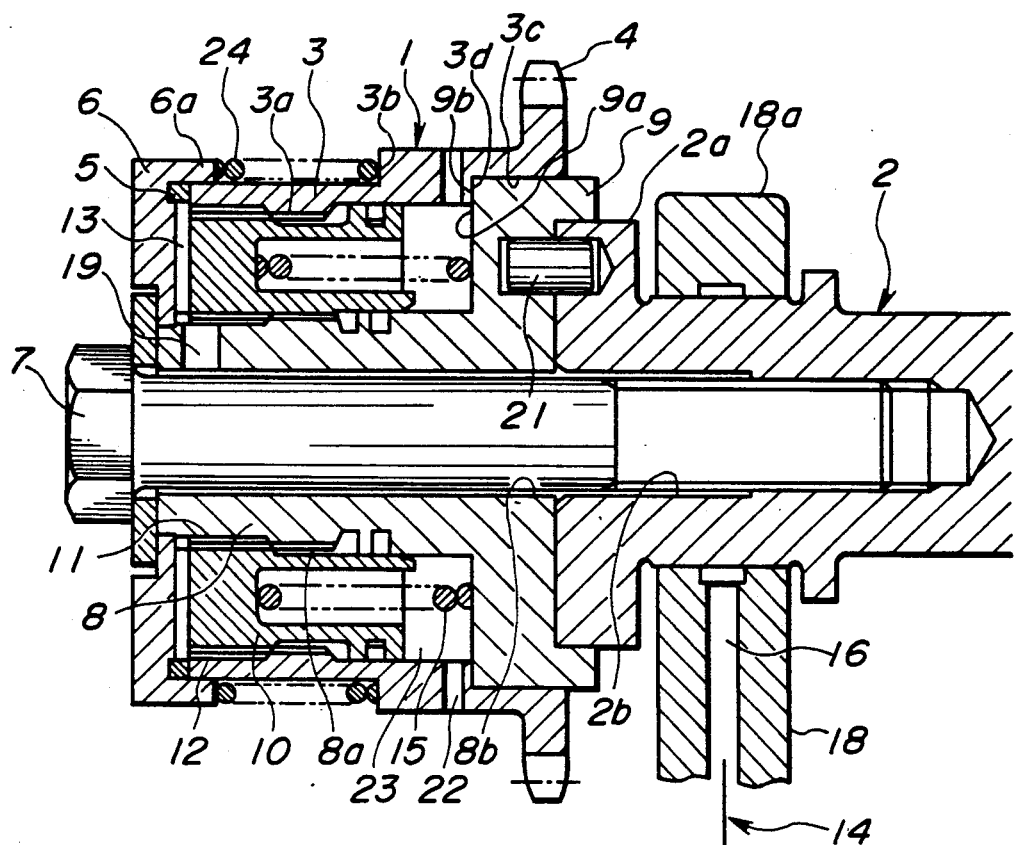
FIG. 1A is a longitudinal cross-sectional view illustrating one preferred embodiment of an intake-and/or exhaust-valve timing control system for internal combustion engines according to the invention.
Figure 1B:
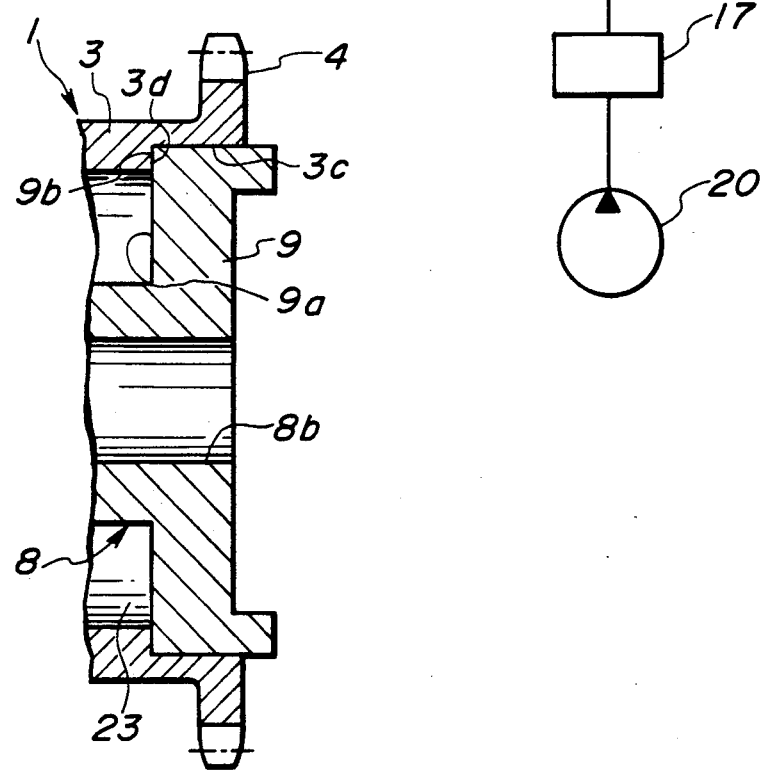
FIG. 1B is a partially cross-sectional view illustrating the embodiment of FIG. 1A.

FIGS. 1A and 1B show a first embodiment of the valve timing control system according to the invention. In the preferred embodiments, since the construction of the first embodiment is basically similar to the other embodiments shown in FIGS. 2, 3, 4A, 4B, 5, 6, 7, and 8, the same reference numerals used to designate elements in the first embodiment as shown in FIGS. 1A and 1B will embodiments according to the invention for the purpose of simplification of description.

FIG. 1A shows the front end section of a camshaft 2 provided for opening and closing an intake-and/or exhaust-valve (not shown). As clearly seen in FIG. 1A, the camshaft 2 is journaled by a cylinder head 18 and a bearing member 18a. Reference numeral 1 denotes a substantially cylindrical rotating member including a cam sprocket 4 driven by a timing chain (not shown) for transmitting torque from an engine crankshaft (not shown). The cam sprocket 4 and the camshaft 2 are coaxially arranged to each other. The rotating member 1 includes an essentially cylindrical section 3 in addition to the cam sprocket 4. The cylindrical section 3 employs a relatively long inner toothed portion 3a axially extending along the inner peripheral wall thereof and a shoulder portion 3b. The rotating member 1 also includes a rear bore 3c having an inner diameter greater than the inner peripheral wall thereof and a radially extending annular surface 3d.

An annular disc 2a is integrally formed at the front end of the camshaft 2. The annular disc 2a has an annular, front flat surface. Reference numeral 8 denotes an inner cylindrical sleeve integrally formed with a flange 9 having an annular, flat front surface 9a. The sleeve 8 includes an outer toothed portion 8a formed on the outer peripheral surface thereof. The sleeve 8 is firmly connected through a knock-pin 21 serving as a positioning pin to the annular disc 2a of the camshaft 2 to rotate with the camshaft, in such a manner that the flat rear surface of the flange 9 abuts the flat front surface of the disc 2a. While the outer circumferential portion of the flange 9 is rotatably fitted into the rear bore 3c of the rotating member 1 such that the outer peripheral surface of the flange 9 abuts the inner peripheral surface of the rotating member 1 defining the rear bore 3c, in a water-tight fashion.

An annular end plate 6 is fitted through a seal ring 5 into the front end of the rotating member 1 in a water-tight fashion. The end plate 6 and the sleeve 8 are fixed together on the disc 2a of the camshaft 2, through a relatively thick plain washer having a high rigidity, by means of a bolt 7, such that the bolt 7 is screwed through the cylindrical hollow defined in the sleeve 8 into an axially extending threaded portion formed at the outermost end of an inner bore 2b defined in the front end of the camshaft 2. When the bolt 7 is screwed into the front end of the camshaft 2, the annular end plate 6 is firmly fixed on the sleeve 8 in such a manner that the inner peripheral surface of the end plate 6 is press-fitted into the outer peripheral surface of the front end of the sleeve 8.

A ring gear 10 is provided between the rotating member 1 and the sleeve 8. The ring gear 10 includes inner and outer toothed portions 11 and 12, respectively meshed with the outer toothed portion 8a of the sleeve 8 and the inner toothed portion 3a of the rotating member 1. At least one of two meshing pairs of teeth (11,8a; 12,3a) is helical to provide axial sliding movement of the ring gear relative to the camshaft 2.

In these constructions, a first fluid chamber 13 serving as a pressure chamber is defined by the inner wall of the end plate 6, the front end of the ring gear 10, and the front end of the sleeve 8 for introducing working fluid, such as a lubricating and cooling oil for the engine, fed from an engine oil pan (not shown) via an engine oil pump 20. As clearly seen in FIG. 1A, the axially forward movement of the ring gear 10 is restricted by the abutment between the inner wall of the end plate 6 and the front end of the ring gear. Conversely, the axially backward movement of the ring gear 10 is restricted by the abutment between the front surface 9a of the flange 9 and the rear end of the ring gear. A second fluid chamber 23 serving as an oil exhaust chamber is defined by the front surface 9a of the flange 9, the rear end of the ring gear 10, the outer peripheral surface of the sleeve 8 and the inner peripheral surface of the rotating member 1.

As seen in FIG. 1A, the valve timing control system of the first embodiment also includes a coil spring 24 disposed between an outer peripheral flange 6a of the end plate 6 and the shoulder portion 3b of the cylindrical section 3 so as to fit the annular surface 3d of the rotating member 1 onto the outer perimeter 9b of the flange 9 with a given biasing force created by the spring 24.

A ring gear drive mechanism for the previously noted ring gear 10 comprises a hydraulic circuit 14 for supplying and draining the working fluid to and from the pressure chamber 13, a compression spring 15 disposed between the rear end of the ring gear 10 and the flange 9 of the sleeve 8 for normally biasing the ring gear in an axially forward direction (viewing FIG. 1A), and an electromagnetic flow control valve 17 for controlling the amount of working fluid flowing through the hydraulic circuit 14. As shown in FIG. 1A, the hydraulic circuit 14 includes an oil passage 16 connected to a radial oil passage (not shown) radially extending in the camshaft 2, an intermediate oil passage defined between the outer periphery of the shaft section of the bolt 7 and inner bores 2b and 8b respectively bored in the camshaft 2 and the sleeve 8, a communication passage 19 intercommunicating the pressure chamber 13 and the above-mentioned intermediate oil passage, and an exhaust passage 22 bored in the rotating member 1 in the vicinity of the cam sprocket 4 for intercommunicating the second fluid chamber 23 employing the return spring 15 and an internal space defined by the cylinder head 18 and the cylinder head cover (not shown) The oil passage 16 communicates upstream thereof through an annular oil passage defined between the outer peripheral surface of the front journaled section of the camshaft 2 and the semi-circular curved surface of the cylinder head 18 and the bearing member 18a, via the flow control valve 17 and a main oil gallery, with the oil pump 20. The flow control valve 17 is controlled by a controller which determines the operating state of the engine on the basis of signals output from various sensors, such as a crank angle sensor for monitoring the crank angle of the engine crankshaft, and an air flow meter for monitoring the amount of intake air introducing through the air cleaner.

The intake- and/or exhaust-valve timing control system for internal combustion engines according to the invention, operates as follows.

Figure 6:
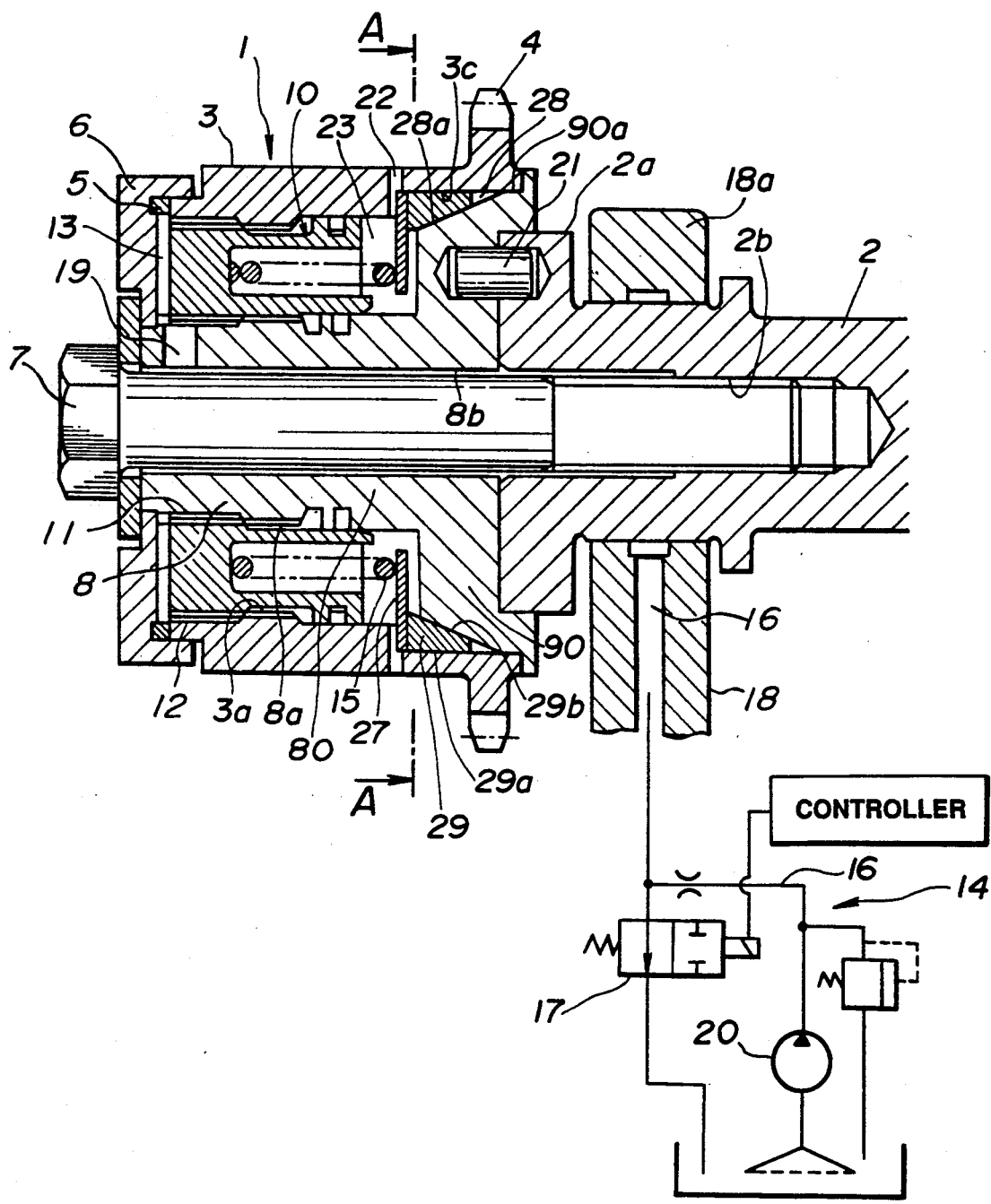
FIG. 6 is a longitudinal cross-sectional view illustrating a sixth embodiment of the valve timing control system according to the invention.

When the engine is operating under low load, the control signal from the previously described controller is in an OFF state, with the result that the deactivated flow control valve 17 blocks the flow of working fluid fed through the oil passage 16 to the pressure chamber 13. If a two-position electromagnetic solenoid valve is utilized as a flow control valve 17 as shown in FIG. 6, the oil within the pressure chamber 13 is exhausted through the communication passage 19, the oil passage 16 and the flow control valve 17 to the oil pan in that order and therefore the pressure within the pressure chamber 13 becomes low. As a result, the ring gear 10 is positioned at the leftmost position (viewing FIG. 1A) by the spring 15. Thus, the relative phase angle between the cam sprocket 4 and the camshaft 2 is set to a predetermined phase angle in which intake-and/or exhaust-valve timing relative to the crank angle is initialized. Under this condition, the timings of intake-valve opening and the closing are in general delayed in relation to the piston position in the cylinder, thereby resulting in a high charging efficiency of air-fuel mixture introduced through the intake-valve to the combustion chamber of the engine, due to the inertia of fluid mass of the introduced mixture.

When the operating state of the engine is changed from a low load to a high load, the control signal generated from the controller is output to an exciting coil of the solenoid valve 17, with the result that the solenoid valve 17 is activated by the controller. Therefor, the pressurized working fluid from the oil pump 20 is fed through the main oil gallery, the flow control valve 17, and the oil passage 16 to the pressure chamber 13, in that order. As a result, since the pressure within the pressure chamber 13 becomes high, the ring gear 10 is moved in the right direction (viewing FIG. 1A) against the spring force created by the spring 15. Therefore, the phase angle between the rotating member 1 and the camshaft 2 is relatively changed to a predetermined phase angle which corresponds to an optimal phase angle during high engine load conditions. Under this condition, the timings of intake valve opening and closing are advanced in relation to the piston position, thereby resulting in a high combustion efficiency, consequently a high engine torque. In this manner, the intake- and/or exhaust-valve timing is variably controlled depending upon the operating state of the engine.

As will be appreciated from the above, since the cam sprocket section of the rotating member 1 is continuously fitted onto the flange 9 of the sleeve 8 with a given biasing force caused by the spring 24, a relatively great frictional resistance is created between the radially extending annular surface 3d and the outer perimeter 9b of the flange 9. A magnitude of the frictional resistance can be easily adjusted by suitably selecting a preset spring force of the spring 24. As is generally known, the camshaft 2 does not always rotate smoothly according to rotation of the cam sprocket 4 but tends to rapidly rotate in either a normal or reverse rotational direction against rotation of the cam sprocket 4 with a relatively large acceleration or fluctuations in rotational speed, due to fluctuations in engine output torque transmitted through the engine crankshaft and reaction forces created by valve springs (not shown). As previously described, such torque fluctuations in the camshaft causes noise due to backlashes between the two meshing pairs of teeth (3a,12; 8a,11). However, the valve timing control system of the first embodiment can reduce such noise, since such a rapid torque fluctuation in a camshaft relative to a cam sprocket is suppressed by friction torque created by the frictional resistance between the annular surface 3d of the rotating member 1 and the outer perimeter 9b of the sleeve 8. That is, the annular surface 3d and the perimeter 9b cooperatingly provide frictional surfaces biased to each other by means of the spring 24 so as to effectively reduce torque fluctuations occurring between the rotating member 1 and the camshaft 2. In this manner, the valve timing control system described in the first embodiment can reduce noise due to backlashes between the two meshing pairs of teeth (3a,12; 8a,11), irrespective of operation of the ring gear 10. The aforementioned friction torque acts to prevent collision between the two meshing pairs of gears.

As set forth above, the valve timing control system according to the first embodiment can reduce noise created during operation of the ring gear without utilizing a conventional complicated and expensive, two-split type ring gear member employing a backlash eliminator. Furthermore, since the valve timing control system of the first embodiment employs a simple ring gear in one piece, the size of the system is reduced.

Second embodiment

Figure 2:
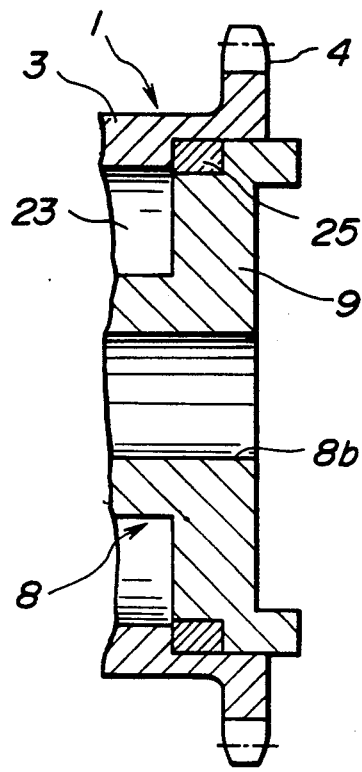
FIG. 2 is a partial cross-sectional view illustrating a second embodiment of the valve timing control system according to the invention.

Referring now to FIG. 2, the second embodiment is different from the first embodiment in that the radially extending annular surface 3d of the cam sprocket section of the rotating member 1 is abutted through an annular friction member 25, such as fiber-glass or carbon fiber onto the outer periphery of the flange 9 of the sleeve 8. The annular friction member 25 can provide a high abrasion proof at the abutting frictional surfaces in addition to a suitable friction torque as previously noted.

Third embodiment

Figure 3:
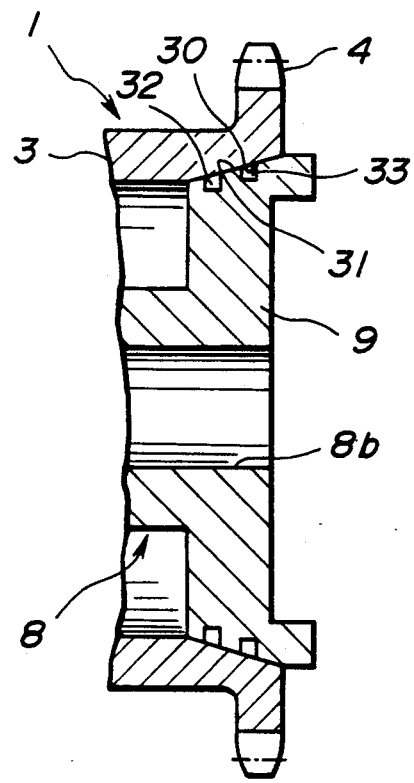
FIG. 3 is a partial cross-sectional view illustrating a third embodiment of the valve timing control system according to the invention.

Referring to FIG. 3, the third embodiment is different from the first embodiment in that the cam sprocket section of the rotating member 1 and the outer periphery of the flange 9 of the sleeve 8 are abutted through a pair of tapered surfaces 30 and 31 opposing to each other. These tapered surfaces 30 and 31 are fitted onto each other with a given biasing force created by the spring 24, thereby resulting in the above suitable friction torque. A modification of the third embodiment provides at least one oil capturing groove, for example oil grooves 32 and 33 formed on the tapered surface 31 in its circumferential direction to capture oil leaking from the second fluid chamber 23. The oil captured groove provides a thin oil film between the tapered surfaces 30 and 31 during relative rotation between the camshaft 2 and the cam sprocket 4, and thereby prevents an excessively great friction torque occurring between the tapered surfaces 30 and 31. As a result, a magnitude of friction torque can be kept at a substantially constant level to reliably reduce noise occurring during operation of the ring gear 10.

Fourth embodiment

Referring to FIGS. 4A and 4B, the fourth embodiment is different from the third embodiment shown in FIG. 3 in that the circumferentially extending oil captured grooves 32 and/or 33 is replaced by a plurality of oil captured grooves 34 extending in a substantially radial direction. The oil grooves 34 functions to provide an optimal friction torque in the same manner as the oil grooves 32 and/or 33 of the third embodiment. The substantially radial oil grooves 34 can be easily manufactured by machining rather than the circumferential oil grooves 32 and 33.

Fifth embodiment

Referring to FIG. 5, the fifth embodiment is different from the third embodiment in that a circumferentially extending oil captured groove 35 is communicated through a radial oil passage 36 radially formed in the flange 9 of the sleeve 8 with the previously described oil passage 16. According to the fifth embodiment, since lubricating oil is positively introduced through the radial oil passage 36 into the oil groove 35, lubricating oil film is reliably formed between the tapered surfaces 30 and 31. Particularly, during high engine load, lubricating oil is forcibly supplied through oil passages 16 and 36 to the oil groove 35, and thereby reliably prevents lack in lubricating oil film between the tapered surfaces 30 and 31.

Sixth embodiment

Figure 7:
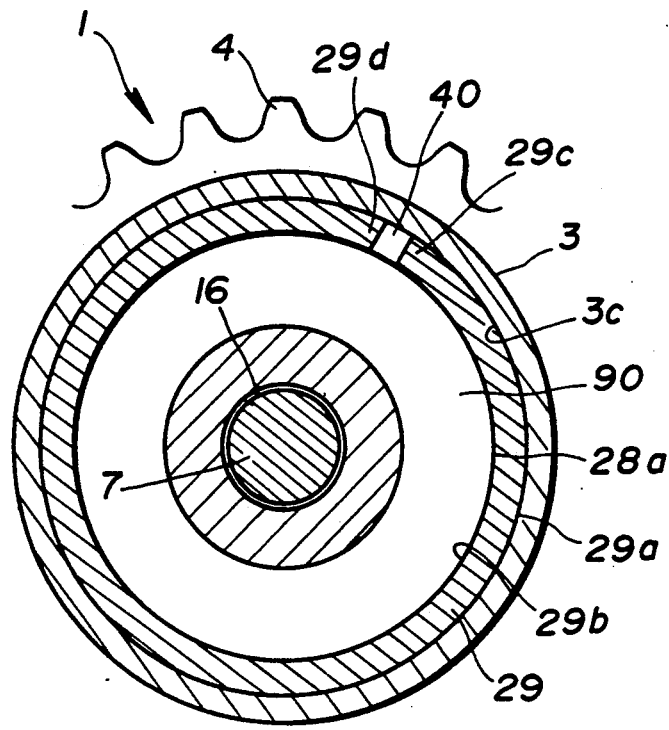
FIG. 7 is a fragmentary cross-sectional view taken along line A—A in FIG. 6.

Referring now to FIGS. 6 and 7, the sixth embodiment is different from the first embodiment in that a substantially annular friction member 29 having a wedge-shape in cross-section is disposed in an annular hollow 28 having a wedge-shape in cross-section and the friction member 29 is press-fitted through an annular push plate 27 into the hollow 28 so as to obtain a suitable friction torque as previously noted. The wedge-shaped hollow 28 is defined between a tapered surface 28a formed on an outer periphery 90a of a flange section 90 of a sleeve 80 in a manner so as to slope up from the front end of the flange 90 to the rear end and the rear bore 3c of the rotating member 1. As clearly seen in FIG. 6, outer and inner peripheral surfaces 29a and 29b of the friction member 29 respectively abut the inner peripheral surface of the rear bore 3c and the tapered surface 28a, such that the outer peripheral surface 29a extends horizontally in the axial direction and the inner peripheral surface 29b extends obliquely with the same inclined angle as the tapered surface 28a in the axial direction. The annular push plate 27 is constantly pushed by means of the spring 15 rearwards (viewing FIG. 6) so as to press the wedge-shaped friction member 29 into the wedge-shaped hollow 28. For this reason, in the sixth embodiment, the spring 24 as utilized in the first embodiment can be eliminated. As shown in FIG. 7, the friction member 29 includes both ends 29c and 29d opposing to each other with a predetermined aperture 40. The aperture 40 allows the friction member 29 to radially and circumferentially expand or contract. Therefore, the two abutting pairs of surfaces (29a,3c; 29b,28a) are constantly press-fitted to reliably provide a desirable friction torque, irrespective of a slight axial movement of the rotating member 1 to the camshaft 2 occurring during operation of the ring gear 10.

Seventh embodiment

Figure 8:
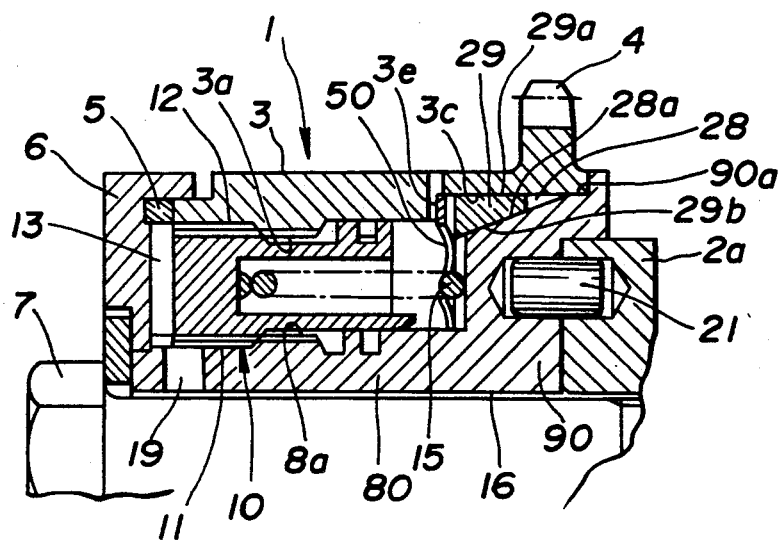
FIG. 8 is a partial cross-sectional view illustrating a seventh embodiment of the valve timing control system according to the invention.

Referring to FIG. 8, the seventh embodiment is different from the sixth embodiment in that the push plate 27 is replaced with a diaphragm type spring 50, such as a wave spring-washer and the rear end of the spring 15 is not associated with the diaphragm type spring 50 but received by the front side wall of the flange 90 of the sleeve 80. The diaphragm type spring 50 is operably disposed between the rear end of the friction member 29 and a shoulder 3e formed on the rear bore 3c. According to the seventh embodiment, the diaphragm type spring 50 and the friction member 29 functions to cooperatingly create a desirable friction torque between the rotating member 1 and the sleeve 80, irrespective of any axial position of the ring gear 10. Since the biasing force applied through the diaphragm type spring 50 to the friction member 29 is suitably determined by selecting a preset spring force of the diaphragm type spring 50, the friction torque may be changed depending on the size of the valve timing control system.

The friction member 29 utilized in the sixth and seventh embodiments can provide a high abrasion proof at the abutting frictional surfaces and prevent the abutting pairs of surfaces (29a,3c; 29b,28a) from locally abrading, thereby assuring a reliable axial alignment between the rotating member 1 and the sleeve 80.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. In an intake- and/or exhaust-valve timing control system for an internal combustion engine including a phase angle changing mechanism disposed between a rotating member having a driven connection with an engine crankshaft and a camshaft for changing a relative phase angle between said rotating member and said camshaft so as to control intake- and/or exhaust valve timing of said engine depending on the operating state of said engine; the improvement comprising:
means for generating frictional torque between said rotating member and said camshaft so as to suppress a rapid change in relative rotational speed of said camshaft to said rotating member; and
said frictional torque generating means comprises at least one abutting pair of frictional surfaces, respectively provided on said rotating member and said camshaft, and means for press-fitting one of said frictional surfaces to the other.

2. The intake- and/or exhaust-valve timing control system as set forth in claim 1, wherein said at least one pair of frictional surfaces are abutted to each other in an axial direction of said camshaft.

3. The intake- and/or exhaust-valve timing control system as set forth in claim 2, wherein said at least one pair of frictional surfaces include radially extending annular surfaces, respectively formed on an inner bore of said rotating member and a side wall of a flange portion of said camshaft.

4. The intake- and/or exhaust-valve timing control system as set forth in claim 2, wherein said at least one pair of frictional surfaces include a pair of tapered surfaces being press-fitted to each other in said axial direction.

5. The intake- and/or exhaust valve timing control system as set forth in claim 4, wherein said friction torque generating means includes at least one oil capturing groove formed on at least on of said tapered surfaces, for providing a thin oil film between said tapered surfaces so as to maintain a substantially constant magnitude of said friction torque.

6. The intake- and/or exhaust-valve timing control system as set forth in claim 5, wherein said oil capturing groove is radially or circumferentially formed on said tapered surface.

7. The intake- and/or exhaust-valve timing control system as set forth in claim 5, wherein said oil capturing groove is connected through a fluid passage formed in said camshaft to a working fluid pressure source.

8. In an intake- and/or exhaust-valve timing control system for an internal combustion engine including a ring gear disposed between a rotating member having a driven connection with an engine crankshaft and a camshaft for changing a relative phase angle between said rotating member and said camshaft so as to control intake- and/or exhaust-valve timing of said engine depending on the operating state of said engine; the improvement comprising:
means for generating friction torque between said rotating member and said camshaft so as to suppress a rapid change in relative rotational speed of said camshaft to said rotating member; and
said friction torque generating means comprising a friction member inserted into a press-fitted section between said rotating member and said camshaft to create said friction torque by two abutting pairs of friction surfaces defined between said friction member and said rotating member and between said friction member and said camshaft, and means for press-fitting said abutting friction surfaces to each other.

9. The intake- and/or exhaust-valve timing control system as set forth in claim 8, wherein said press-fitting means includes a spring operably supported at the front end of said camshaft such that one of said frictional surfaces is biased to the opposing frictional surface.

10. In an intake- and/or exhaust-valve timing control system for an internal combustion engine including a ring gear disposed between a rotating member having a driven connection with an engine crankshaft and a camshaft for changing a relative phase angle between said rotating member and said camshaft so as to control intake- and/or exhaust-valve timing of said engine depending on the operating state of said engine; the improvement comprising:
means for generating friction torque between said rotating member and said camshaft so as to suppress a rapid change in relative rotational speed of said camshaft to said rotating member; and
said friction torque generating means comprising a friction member having a wedge shape in cross-section, inserted into a press-fitted section between said rotating member and said camshaft to create said friction torque by two abutting pairs of friction surfaces defined between said friction member and said rotating member and between said friction member and said camshaft, and means for press-fitting said friction member into said press-fitted section.

11. The intake- and/or exhaust-valve timing control system as set forth in claim 10, wherein said press-fitting means for said friction member includes a spring operably disposed between said rotating member and said camshaft for biasing said ring gear in one axial direction.

12. The intake- and/or exhaust-valve timing control system as set forth in claim 10, wherein said press-fitting means for said friction member includes a diaphragm type spring operably received on an inner peripheral wall of said rotating member.

13. The intake- and/or exhaust-valve timing control system as set forth in claim 12, wherein said diaphragm type spring is comprised of a wave spring-washer.

14. The intake- and/or exhaust-valve timing control system as set forth in claim 12, wherein said wedge-shaped friction member includes both ends opposing to each other with a predetermined aperture for allowing said friction member to radially and circumferentially expand or contract so as to provide a substantially constant magnitude of said friction torque during operation of said ring gear.

* * * * *